US012460810B2

(12) United States Patent
Burghard

(10) Patent No.: US 12,460,810 B2
(45) Date of Patent: Nov. 4, 2025

(54) LUMINAIRE AND LIGHTING ARRANGEMENT

(71) Applicant: Sompex Im-und Export, Handelsgesellschaft mit beschränkter Haftung & Co. Kommanditgesellschaft, Düsseldorf (DE)

(72) Inventor: Florian Burghard, Neuss (DE)

(73) Assignee: Sompex Im-und Export, Handelsgesellschaft mit beschränkter Haftung & Co. Kommanditgesellschaft, Düsseldorf (DE)

( * ) Notice: Subject to any disclaimer, the term of this patent is extended or adjusted under 35 U.S.C. 154(b) by 0 days.

(21) Appl. No.: 18/683,826

(22) PCT Filed: Aug. 19, 2022

(86) PCT No.: PCT/DE2022/100626
§ 371 (c)(1),
(2) Date: Feb. 15, 2024

(87) PCT Pub. No.: WO2023/020666
PCT Pub. Date: Feb. 23, 2023

(65) Prior Publication Data

US 2024/0360994 A1 Oct. 31, 2024

(30) Foreign Application Priority Data

Aug. 19, 2021 (DE) ..................... 20 2021 104 455.1
Oct. 8, 2021 (DE) ..................... 20 2021 105 454.9

(51) Int. Cl.
*F21V 33/00* (2006.01)
*F21S 6/00* (2006.01)
(Continued)

(52) U.S. Cl.
CPC .......... *F21V 33/0028* (2013.01); *F21S 6/002* (2013.01); *F21S 9/02* (2013.01); *F21V 1/16* (2013.01);
(Continued)

(58) Field of Classification Search
CPC ........ F21V 33/0028; F21V 1/16; F21V 21/08; F21V 23/04; F21S 6/002; F21S 9/02; F21Y 2105/18; F21Y 2115/10
See application file for complete search history.

(56) References Cited

U.S. PATENT DOCUMENTS 2,724,048 A * 11/1955 De Sherbinin ....... F21V 21/116 403/197
2,921,708 A 1/1960 Marcel
(Continued)

FOREIGN PATENT DOCUMENTS

CN 203907557 U † 10/2014
FR 1092867 A † 4/1955
(Continued)

OTHER PUBLICATIONS

DeepL machine translation of FR1092967A, obtained Feb. 2024.
(Continued)

*Primary Examiner* — Mary Ellen Bowman
(74) *Attorney, Agent, or Firm* — CAHN & SAMUELS, LLP

(57) ABSTRACT

A luminaire or lamp (10) with an umbrella-like lamp body (16), wherein the lamp (10) has at least one lighting element (20) integrated into the lamp body (16), which in the position of use emits light at least in one downward direction. The lamp body (16) has on its underside a conical stem-like element (28), which is used to fixate the lamp (10) above the neck opening (14) of a commercially available bottle (12) is formed, the light source being arranged in a
(Continued)

ring or wreath shape around the stem-like element and preferably above it. The lamp (10) may be easily be fixed for example in standard wine or spirit bottles and provides glare-free and effective lighting for both the bottle itself and the surrounding area.

15 Claims, 2 Drawing Sheets

(51) Int. Cl.

| | |
|---|---|
| ***F21S 9/02*** | (2006.01) |
| ***F21V 1/16*** | (2018.01) |
| ***F21V 21/08*** | (2006.01) |
| ***F21V 23/04*** | (2006.01) |
| ***F21Y 105/18*** | (2016.01) |
| ***F21Y 115/10*** | (2016.01) |

(52) U.S. Cl.
CPC .............. *F21V 21/08* (2013.01); *F21V 23/04* (2013.01); *F21Y 2105/18* (2016.08); *F21Y 2115/10* (2016.08)

(56) References Cited

U.S. PATENT DOCUMENTS

| | | | | | |
|---|---|---|---|---|---|
| 3,729,628 | A | | 4/1973 | Schwartz | |
| 4,872,572 | A | * | 10/1989 | Schrooten | B65D 51/241 215/310 |
| 5,535,900 | A | * | 7/1996 | Huang | B65B 31/047 137/526 |
| 9,677,726 | B1 | * | 6/2017 | DeLuca | F21V 23/04 |
| D1,027,279 | S | | 5/2024 | Burghard | |
| D1,041,068 | S | | 9/2024 | Burghard | |
| 2004/0141886 | A1 | * | 7/2004 | Py | B65B 3/003 141/329 |
| 2004/0223332 | A1 | * | 11/2004 | Yang | B65D 39/16 362/362 |
| 2013/0223085 | A1 | * | 8/2013 | Peng | F21V 1/00 362/477 |
| 2014/0078735 | A1 | | 3/2014 | Premysler | |

FOREIGN PATENT DOCUMENTS

| | | | | |
|---|---|---|---|---|
| GB | 30371 | A | | 11/1898 |
| GB | 443402 | A | † | 2/1936 |
| GB | 821770 | A | | 10/1959 |

OTHER PUBLICATIONS

English abstract for CN203907557U, Oct. 29, 2014.
English machine translation for CN203907557U, Oct. 29, 2014.
International Preliminary Report on Patentability, Nov. 2023, 6 pages.

* cited by examiner
† cited by third party

LUMINAIRE AND LIGHTING ARRANGEMENT

This U.S. patent application is a national stage application of PCT/DE2022/100626 filed on 19 Aug. 2022 and claims priority of German patent document 20 2021 104 455.1 filed on 19 Aug. 2021 and German patent document 20 2021 105 454.9 filed on 8 Oct. 2021, the entireties of which are incorporated herein by reference.

BACKGROUND AND SUMMARY OF INVENTION

The invention relates to a lamp (or a luminaire), in particular a table lamp, with an umbrella-like lamp body, the lamp having at least one lighting element integrated into the lamp body, which in the position of use emits light at least in one downward direction.

For lights, especially table lamps, such as in restaurants on guest tables or dining boards (typically in addition to or instead of candles) or in private sectors, high demands are made regarding design, light quality, light color and freedom from glare. Furthermore, from a sustainability perspective, there is nowadays a general need for the reuse of everyday objects, especially in rather unusual contexts.

The invention is based on the objective to create a lamp of the type mentioned at the beginning, which combines high-quality, glare-free table or board lighting with an interesting and varied design, and at the same time demonstrates a visible and original contribution to material recycling.

The aforementioned objective is solved by means of a lamp with the features of patent claim 1 or by means of a lamp with the features of patent claim 15.

Advantageous embodiments of the invention are explained in the dependent claims.

According to the invention, in a lamp of the type mentioned at the outset, it is provided that the lamp body has a stem-like (or handle-like) element on its underside, which is designed to fixate the lamp in the neck opening of a commercially available bottle.

In this context, it should be emphasized—also for the following explanations—that mentioned commercially available bottle does not represent an actual component of the lamp according to the invention; rather, the lamp is designed to cooperate advantageously with such a bottle.

This means that the lamp can be used using almost any (unsealed) bottle—as long as the diameter of the bottleneck is compatible with the stem-like element—with the bottle then serving functionally as a kind of lamp base.

For example, simple, label-less glass bottles (wine bottles or mineral water bottles) may be used, but also champagne bottles, beer bottles, spirit bottles, “Bocksbeutel”-like bottles or the like, each with a label or without label (with a label that has been detached or originally has been not present), each made of white glass or stained glass.

Furthermore, it is provided according to the invention that the lighting element has at least one ring or wreath of lighting elements which is arranged around the stem-like element. The ring or wreath may either be formed from individual light emitters (especially LEDs) with a specified angular distance, whereby from three LEDs with approximately 120° angular distance onwards it can be spoken from a ring or wreath; however, significantly more individual light emitters are preferably provided. Alternatively, or additionally, one or more line-shaped LEDs may also be used.

Furthermore, it is provided according to the invention that the lighting element or at least one of the lighting elements is positioned with regard to its height position above the stem-like element or in the area of the base of the stem-like element or above the front end of the stem-like element, said front end facing away from the lamp body.

Ultimately, the ring-shaped or wreath-shaped lighting element (or at least one of the lighting elements, if several are provided) should not be situated below the end face of the stem-like element in terms of its height position—this height position is the positioning along an imaginary central axis that runs centrally through the stem-like element-but should be preferably situated above the stem-like element or approximately at the height of the mounting base of the stem-like element or slightly below.

The arrangement of the lighting elements essentially above the stem-like element—and therefore usually above the bottle opening—has the advantage, on the one hand, that with common bottle heights and with common table heights, the lamp is therefore overall at a height at which the lighting elements on the underside are not yet directly visible, even from the usual sitting perspective (freedom from glare), but still illuminating the surrounding area in an optimal way.

Furthermore, when the lamp is positioned “high” according to the invention, the bottle itself, including any labels on the neck of the bottle, is largely visible and even additionally illuminated, so that the invention can also advantageously be used for visually highlighting the bottles, e.g. for wine presentations or the like. Existing structures at the bottleneck, e.g. glass screw threads or the parts of a colored capsule film surrounding the bottle mouth, can be highlighted particularly effectively by the lighting.

Finally, with an inventive arrangement of the lamp above the bottle opening, it is advantageous that the light is generally illuminated into the edge of the bottleneck.

Especially in the case of glass bottles, this light feed into the front edge creates a light-conducting effect (transmission of light through multiple total reflection), which leads to an internal glow of the bottle glass or any bottle contents and thus leads to an interesting optical effect.

In an advantageous embodiment of the invention, the stem-like element is conical on the outside at least in sections, preferably with a cone angle ≥4°, particularly preferably ≥5°. These cone angles, which are relatively high for stoppers, enable usage for a wide range of bottleneck diameters, but tend to impair the stability of the stem-like element in the bottleneck, so that further measures should generally be provided to improve frictional fixation.

For this purpose, the stem-like element may be formed at least on its outside from a rubber-elastic material, preferably from a silicone elastomer, wherein the stem-like element is particularly preferably formed essentially completely from a silicone elastomer.

Furthermore, the stem-like element may preferably have a recess that is open towards the free end thereof.

Thanks to the recess, which is open towards the free end, the lamp body can be attached without conversion in an alternative way, e.g. it may be placed on a suitable rod or post. The stem-like element designed in this way allows fixation both by positively or loosely encompassing the outer contour (as when inserted into a bottleneck) and by positively or loosely engaging in the recess provided in the stem-like element (e.g. by attaching it to a rod), i.e. by means of the inner contour of the stem-like element.

Such a recess also improves the effect of material elasticity of the stem-like element, since it becomes compressible to a certain extent through the recess. Furthermore, access to a hidden fastening screw can be established via the recess.

The recess might not extend to the bottom of the stem-like element, but might end or taper at a position further up (for example, the recess might going over into a considerably narrower through-hole for a fastening screw). This stabilizes the section of the stem-like element on the lamp body side that is not "hollowed out" by the recess, so that the deformation of the stem-like element can be limited or controlled.

Particularly advantageously, the stem-like element is conical on the outside, has a recess that is open towards the free end of the stem-like element said recess does not have to extend to the bottom of the stem-like element, and said stem-like element consists—at least in the area of the recess-of an elastic material.

As a result, the stem-like element may be compressed by a predetermined amount when fixed in the neck opening of a commercially available bottle, so that a reliable frictional fixation in a bottleneck opening and/or an adaptation to non-round bottleneck openings can be achieved. When plugged into the bottleneck, a pre-tensioning force is automatically created in the bottleneck due to the compression, which ensures a very reliable frictional fixation within the bottleneck, but which can also be easily released again.

In addition, with this design of the stem-like element, a temporary sealing of the bottle may be achieved, so that—assuming the stem-like element material is food-safe, which is the case in a preferred embodiment—the lamp according to the invention may also be used as a temporary bottle closure, for example for the closure of carbonated drinks.

The stem-like element is preferably dimensioned so that an optimal hold is guaranteed in a variety of common bottleneck diameters, the stem-like element preferably being designed to be significantly shorter than, for example, would it typically be the case with a lamp base of a classic shade lamp, since the lamp base is preferably formed by the bottle itself.

In an advantageous embodiment, the stem-like element may have one or more of the following dimensional or material properties-as far as they are compatible with one another:

- the length of the stem-like element corresponds to 30% to 100% of the total height of the lamp body, preferably 25% to 50% of the total height of the lamp body; and/or
- the total length of the stem-like element is between approximately 30 mm and approximately 50 mm; and/or
- the outer diameter of the stem-like element-optionally tapering conically towards the free end-is between approximately 10 mm and approximately 25 mm; and/or
- the outer diameter of the stem-like element tapers from a diameter on the lamp body between 19 mm to 22 mm to a diameter at the free end between 15 mm to 18 mm; and/or
- the stem-like element has a central, longitudinally extending recess which is open towards the free end and has a diameter between 5 mm and 12 mm; and/or
- the stem-like element has a central, longitudinally extending recess which is open towards the free end and which extends only over approximately 30% to 60% of the length of the stem-like element; and/or
- the stem-like element is made from food-safe materials.

In a preferred embodiment, the at least one lighting element integrated into the lamp body has a ring or wreath, each formed from at least three, preferably more than three, individual light-emitting diodes evenly distributed over the circumference and/or formed from at least one line-shaped LED, whereby the main radiation direction of the LEDs points downwards.

At least one of the lighting elements formed from ring-shaped or wreath-shaped light emitters preferably has a ring or wreath radius ≤approximately 3.5 cm, so that its ring or wreath radius is smaller or not significantly higher than the radius of conventional bottles, especially wine bottles, which ensures that the lighting element can illuminate the neck and shoulder structures of the bottle. Typical narrow wine bottles (0.75 l) have for example a minimum radius of approximately 3 cm (diameter approximately 6 cm). Therefore, with a given tolerance, the above dimension results, whereby a particularly suitable radius for the lamp ring is approximately 3 cm.

Due to the already mentioned "high" positioning of the lamp, in a preferred embodiment of the invention, in which the bottleneck area is not covered by the umbrella-like lamp body or is possibly only slightly covered in a mouth area of the bottleneck area, the light can radiate downwards in a ring or wreath shape The illuminant is reflected from the upwardly tapering bottleneck surfaces into the surrounding space, which leads to interesting optical effects. Due to the inclusion of the reflecting surfaces of the bottle, the lamp according to the invention therefore has a different lighting effect than a conventional, otherwise comparably sized table lamp that is simply arranged on a rod.

In one embodiment, a battery or a rechargeable battery element may be integrated into the lamp body, through which the at least one lighting element can be supplied with power wirelessly.

In view of the power requirements of current LEDs and in view of the fact that such table lamps are used as selective lighting with rather low light outputs and in view of the battery technology available today, continuous operating times of several hours can easily be achieved with common batteries.

Should this not be enough, "empty" lights may be replaced very easily and quickly with charged ones (much like replacing a candle). It is also conceivable, especially for outdoor use, that solar cells could be provided e.g. on the top or outside, which would ensure solar charging of the batteries.

In one embodiment, the umbrella-like lamp body may be made of a non-transparent material, so that the lamp essentially only emits downwards. In this case, this is different to classical table lampshades (e.g. made of colored glass), which are often partially transparent allowing a little light from the lamp to pass through in the form of a "glow". However, the latter—i.e. a transparent or partially transparent design of the side surfaces of the lamp body-is also conceivable according to the invention.

The term "umbrella-like" lamp body is not intended to imply that it necessarily has to have the classic shape of a lampshade, which corresponds to a circular cone section that tapers conically upwards.

Of course, e.g. a purely cylindrical or an inverted conical shape is possible. The basic shape of the lamp body does not necessarily have to be circular, but may also be elliptical or based on a polygon.

What is ultimately important is that there is a certain protrusion towards the bottom of the diameter of the bottleneck, i.e. in principle a spherical shape of the umbrella-like lamp body would also be possible, or figures or objects, e.g. champagne corks, could be reproduced in an enlarged form.

In one embodiment, the umbrella-like lamp body is preferably round in top and bottom view, with at least one button-like or contactless switching element being provided on its top side for switching the at least one lighting element on/off and optionally for adjusting the brightness and/or light color. If necessary, the switching element may also be positioned elsewhere (e.g. inconspicuously attached to the underside of the lamp body).

Particularly preferably, the lamp is splash-proof and/or protected against the ingress of foreign bodies, so that outdoor use is possible without any problems. Typically, the lamp may be designed according to protection class IP44 (corresponding to the usual protection class for wet rooms), which in a preferred embodiment can be achieved with manageable design effort due to the relatively few construction-related seams that need to be sealed.

Alternatively or additionally, differentiated and central lighting control via a remote control (via ISM-band radio receiver or e.g. via WLAN or Bluetooth) could be conceivable. Such more differentiated control options are of particular interest if the light color could also be adjusted using RGB or RGBW light-emitting diodes. It is also conceivable that there could be an automatic on/off switch or an automatic brightness adjustment based on a signal from an ambient light sensor.

It is also conceivable to integrate one or more speakers into the lampshade, preferably on the underside in the area not required by the light-emitting diodes, which could be addressed via audio streaming (WLAN/Bluetooth or the like) from the integrated energy storage device and thus enable sound to be provided to a table society-possibly also with surround sound by using several loudspeaker lamps. Of course, it is also conceivable to implement this acoustic functionality without the lighting function. A bass reflex opening could also be provided on the top of the lamp body to improve sound quality.

Finally, within the scope of the invention, a lamp arrangement (or a "set") is proposed which comprises a lamp (the lamp body) of the pre-described type as well as a suitable bottle as a lamp holder, in the bottleneck of which the lamp may be fixated with the stem-like element.

This "set" eliminates the need for the user to source or select a suitable bottle, not-withstanding that the user can always use "own" bottles if preferred.

In addition, the set may contain a base with a holding rod, which is coordinated with the recess in the stem-like element, with a stationary charging and/or voltage supply connectable via contacts at the end of the holding rod, which could come into contact with suitable contacts inside the stem-like element, for which the holding rod may then typically be supplied via a stand with a low-voltage power supply or its own batteries. Alternatively, inductive charging may also be made possible via corresponding coupling coils incorporated into the lampshade.

The present invention is also suitable, for example, for highlighting certain drinks (wines or the like) offered at an event in a novel way by presenting the corresponding bottles.

Because a lamp according to the invention can be easily separated from the "carrier bottle", a lamp according to the invention may also be used "purely", i.e. without the bottle as a stand, for other lighting purposes, for example by turning the lampshade "upside down", as an "Uplight" for temporary effect lighting of objects or signs from below or from the side, or by placing it on the outer surface of the shade so that the lamp shines upwards at an angle like a small spotlight specifically illuminating certain objects.

The stem-like element in the lamp according to the invention may therefore fulfill several functions at the same time:

- For loose or form-fitting fixation of the lamp in a bottle;
- if necessary. as a bottle stopper for a bottle with consumable contents;
- for loose or form-fitting fixation of the lamp on a rod (using the recess); and
- as a handle for easy transportation of the lamp (e.g. for charging) without leaving fingerprints or the like on the lamp body itself.

The stem-like element described above may be designed to be easily connectable to and separable from the lamp body by a user—e.g., via a threaded connection, a clip or a bayonet lock—and may also be offered as a separate optional accessory for fixing a lamp body in the neck of a standard bottle. The stem-like element may preferably have the features as described above, in particular production as a conical hollow cylinder made of a preferably food-safe silicone elastomer with a total length that is rather shorter than the height of the lampshade.

Furthermore, it would be conceivable for a corresponding lamp body to be equipped with a conventional holding rod (possibly with a stand), the holding rod being releasably fixed on the lamp side in a stem-like element in the sense of the invention, so that the lamp may be easily converted by the user to be fixed into a commercially available bottle.

Furthermore, an alternative connecting element is proposed that can be connected to an umbrella-like lamp body of a lamp instead of the stem-like element described above (e.g. by means of a screw connection). The alternative connecting element is suitable for fixing the lamp body in the neck opening of a commercially available bottle closed with a (natural or artificial) cork by having a screw spindle in the manner of a corkscrew, which may be screwed into the material of the cork a few turns for fastening until a sufficient hold is achieved.

BRIEF DESCRIPTION OF THE DRAWINGS

The invention is explained in more detail below using the exemplary embodiment shown in the drawings, whereby the drawings show.

DETAILED DESCRIPTION OF THE INVENTION

Figure 1:
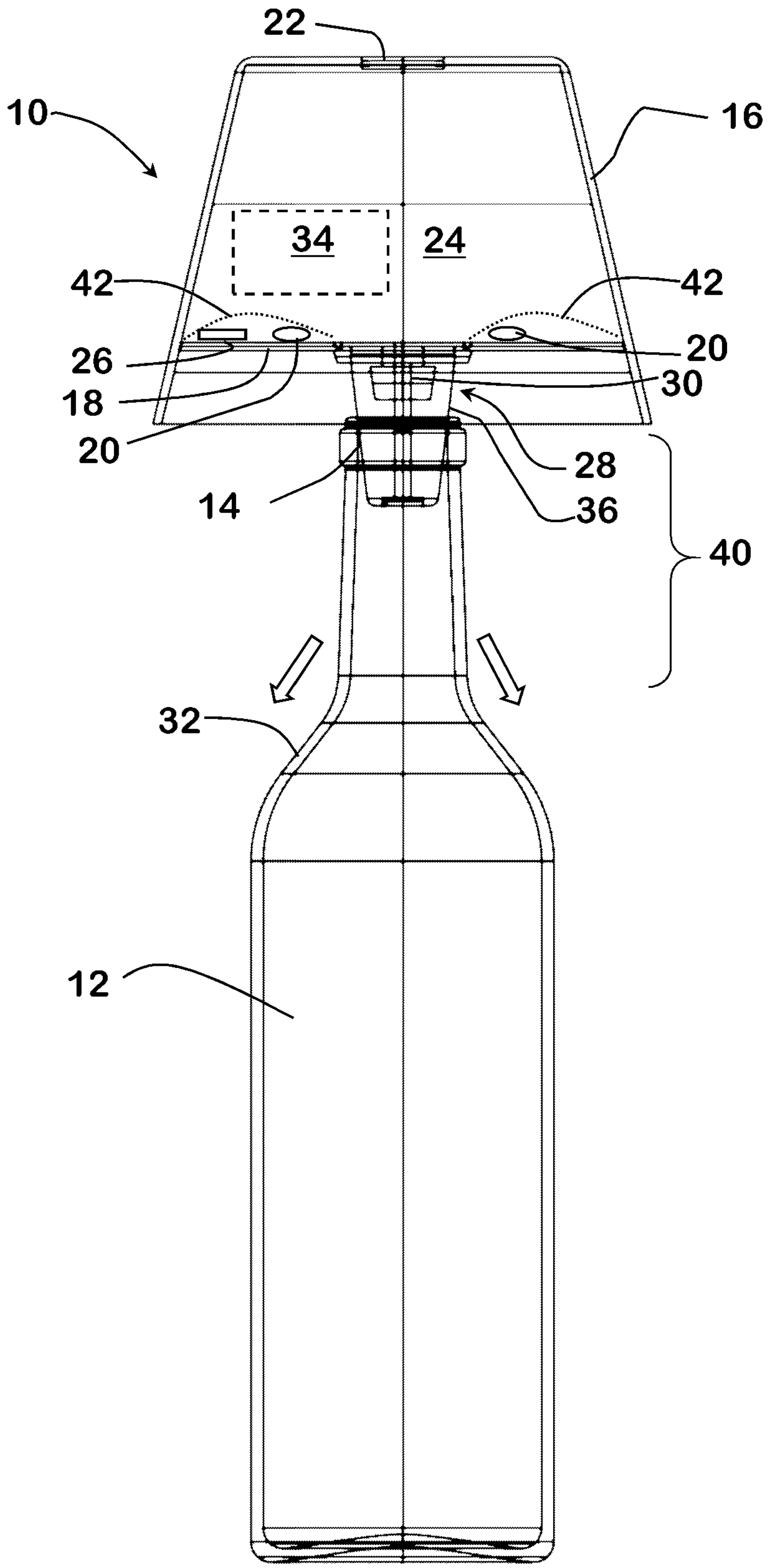
FIG. 1 shows an overall sectional view of a lamp according to the invention with a transparent water bottle as a lamp base.
Figure 2:
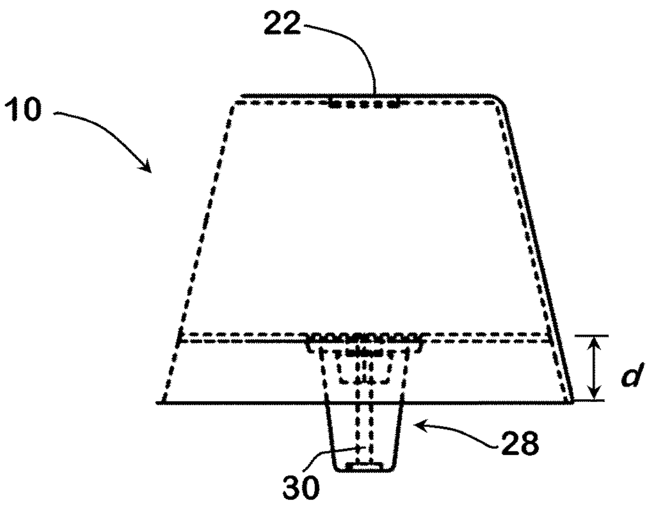
FIG. 2 is a schematic representation of the lamp according to FIG. 1 in a state removed from the bottle.

A lamp generally designated with 10 (without considering the bottle 12 serving as a holder) has—the exemplary embodiment—a typical conical lampshade shape in, although, as mentioned, other shapes (cylindrical, polygonal based shapes, hemispherical shape, etc.) would also be possible. The bottles used will often be empty. However, if the stem-like element is designed to be suitable for foodstuffs, it is also possible to close a completely or partially filled bottle with the lampshade. If necessary, the bottle may be filled with at least water or a colored liquid in order to increase stability on the one hand and to achieve an additional optical effect through the illuminated liquid interface on the other hand.

The lamp 10 has a lamp body 16, in the interior 24 of which a circumferential LED ring or LED wreath is provided (shown schematically)—also referred as lighting element 20—, the light of which emerges from the underside of the lamp body 16 through a satin-finished plastic disk 18, which serves as a diffuser. The terms "ring" or "wreath" should be used synonymously, whereby the lighting effect may be created both by individual LEDs arranged at predetermined angular distances and by correspondingly curved linear LEDs.

Figure 3A:
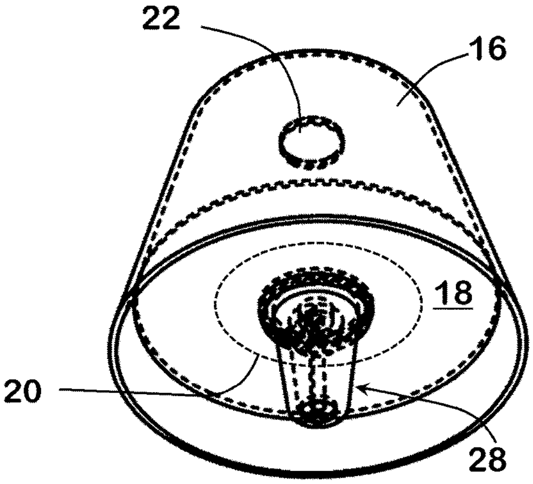
FIGS. 3*a, b* show schematic bottom views of the lamp from FIG. 2 according to the invention.
Figure 3B:
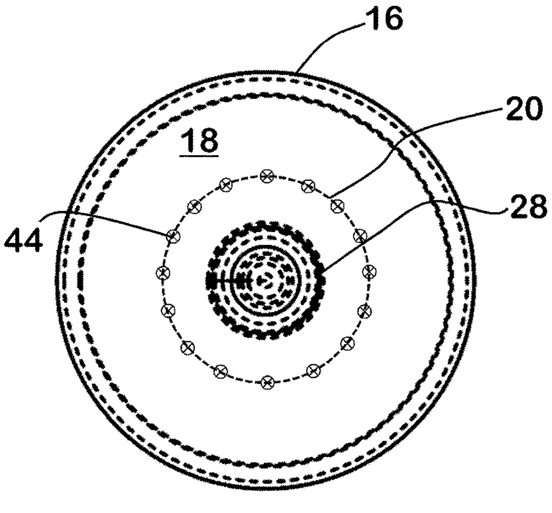

In FIG. 3*b*, the individual LEDs 44 arranged in a ring or wreath shape—consisting of 16 LEDs in the example—are indicated schematically, whereby the number and angular spacing of the LEDs can of course vary within a wide range. The ring or wreath radius is chosen so that in commercially available bottles the lighting element 20 does not protrude or does not protrude significantly beyond the bottle body. For example, slim wine bottles typically have a radius of approximately 3 cm, so that with a positioning at approximately 3 cm (possibly also 3.5 cm) the bottleneck and bottle shoulder structures can be optimally illuminated.

In addition to the arrangement shown, a variety of other arrangements are conceivable. For example, several LED rings may be provided, LEDs may shine directly downwards on a plate without a diffuser, etc., and additional lighting elements may also be provided that may radiate diffusely upwards or illuminate the screen surfaces, although in the exemplary embodiment the screen-except for the backlit sensor switch-is non-transparent on the side and top.

In the area of the LED ring and surrounding the LEDs, a curved reflector element 42 is provided in the interior 24 of the lamp 10 in order to optimize the light distribution and light output. The reflector element 42 is in the exemplary embodiment made as a one-piece rotating body made of reflective metal (e.g. aluminum), which extends approximately from the outer edge of the screen or diffuser 18 to the radial starting point at the beginning of the stem-like element 28 and directs the light essentially evenly downwards, the light also being deliberately directed onto the area along the stem-like element 28 in particular to illuminate the bottleneck area 40.

The diffuser plate 18 is offset in the umbrella-like lamp body 16 by a distance d (e.g. offset upwards by approximately 1 to 2 cm) in the upper direction, i.e. the edge of the lamp body 16 remaining underneath prevents the lighting element from being directly visible and thus glare effects are prevented.

As can be seen in the exemplary embodiment, the lighting element 20 are positioned slightly above the base of the stem-like element 28 (which coincides with the diffuser plate).

It would also be conceivable within the scope of the invention to bring the lighting element 20 to a lower position using suitable support structures (not shown) projecting from the lower edge of the lamp body. However, within the scope of the invention, the lighting element (or at least not all lighting elements, if several are provided) should not be arranged deeper than the front end of the stem-like element 28 facing away from the lamp body 16.

As indicated by the arrows in FIG. 1, the light radiating essentially downwards is reflected or redirected through the curved areas of the bottleneck or the bottle shoulder, creating interesting lighting effects.

The LEDs of the LED ring 20 are preferably warm tone or warm white LEDs or LEDs that can be switched between these modes. Colored or color-adjustable RGB or RGBW LEDs are also possible.

A battery, schematically designated as 34, is also integrated into the lamp body 16 which can be charged via cable connections (not shown) and charging and control electronics (not shown) via a USB charging port 26 on the underside of the lamp body 16 (e.g. according to the USB-C or Micro-USB standard), although other connection types, such as a connection for a jack plug or inductive charging, may also be utilized.

The charging connection 26 is integrated into the diffuser plate and is preferably provided with a captive protective cap. The integration of the charging connection 26 into the diffuser plate—which points downwards in the position of use and is therefore protected—simplifies splash protection, so that the lamp according to the invention—with a sufficiently sealed switch at the top and an otherwise tight housing—may be basically also suitable for outdoor use (at least with protection against falling dripping water). In particular, the housing may be protected according to IP44.

Since the lamp 10 can be removed and turned over very easily from the object serving as a base, in particular from a bottle 12 used as a base, the charging connection 26 in the lamp 10 according to the invention is particularly easy and convenient to access. The charging process may be signaled by colored LEDs (not shown) integrated behind the diffuser plate 18, e.g. red LED=charging in progress, green LED=charging completed.

The lighting element may be switched on and off via a push switch 22, which is positioned centrally in the top of the lamp body 16, and the brightness may optionally be adjusted via an electronic dimmer circuit by pressing and holding for a longer period of time. The push switch 22 is preferably designed as a sensor button and is preferably designed so that no light is accidentally switched on, even with a lamp turned upside down, in which the switch area serves on a support surface. The button of the switch 22 can be made opaque so that it lights up when the lighting elements inside the lamp body are activated.

When the batteries are fully charged, the lighting duration is typically several hours. In the exemplary embodiment, the lamp body 16—apart from the diffuser plate 18—is designed to be non-transparent, i.e. the usual "glow" of a lampshade is not present here, but would be possible by appropriate choice of material; further, if necessary, additional internal lighting elements (possibly in colors other than those of the downward-pointing lighting element) may also be implemented.

It would also be conceivable that one or more additional lighting devices, for example one or more LEDs, could also be provided on the underside or on the edge of the stem-like element 28.

A special property of the lamp 10 according to the invention is that it can be fixed in the neck of a standard open bottle 12 via a stem-like element 28 with one "grip".

For this purpose, the conically tapering stem-like element 28 consists essentially of a rubber-like material 36, in the exemplary embodiment of a silicone elastomer, which is either applied or attached to a harder plastic core (not shown), or which has a central recess 30 and fixates the lamp 10 in bottlenecks with a (within certain limits) variable diameter.

To fixate the lamp body 16, a positive or frictional connection of the stem-like element in the bottleneck 14 by means of the rubber-elastic material is desirable, but not absolutely necessary.

For bottles 12 with a larger neck diameter than the maximum diameter of the stemlike element 28, it is usually sufficient if the stem-like element 28 is inserted "loosely" into the bottleneck. Then the lower end surface of the lamp body 16 (usually the diffuser plate 18) rests on the edge of the bottleneck 14 and holds the lamp body 16 in a straight, upright position. This is the lowest position of the lamp according to the invention in relation to the bottle opening. For narrower bottlenecks, the actual height is determined by the possible insertion depth of the stem-like element 28.

Since the mentioned lower end surface of the lamp body (the diffuser) 18 is expediently projected beyond the outside by an edge of the lampshade (of width d) in order to avoid direct visibility of the diffuser plate and thus of the light source (glare protection), it may occur at the lowest position (i.e. with a wide bottleneck and the bottle mouth resting almost directly on the diffuser plate) that the edge of the lampshade protrudes slightly beyond the uppermost mouth section of the bottleneck.

Figure 4:
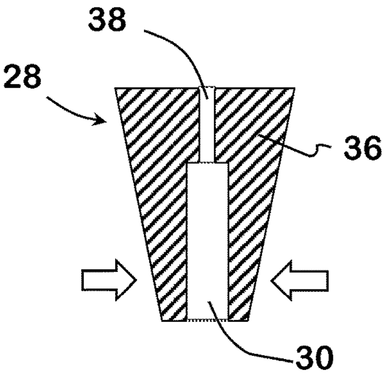
FIG. 4 is a schematic sectional view of a stem-like element with a recess.

In FIG. 4, a preferred variant of the stem-like element 28 with recess 30 is shown schematically in a sectional view. The recess 30 causes the remaining tubular elastic material 36—as indicated by the arrows in FIG. 4—to be compressed, whereby the stem-like element 28 can be held particularly well in a frictional manner. Furthermore, the stem-like element 28 can adapt to non-round bottle opening cross-sections within limits and can even seal the bottle. The recess 30 does not extend to the bottom of the stem-like element 28, but rather merges into a recess 38 with a smaller cross section to accommodate a fastening screw (not shown), which may be screwed into a threaded counterpart in the lamp body and which is accessible via the recess 30, so that an alternative fastening-such as a usual rod with a base (not shown)—or a corkscrew—like connecting element, also not shown, can be screwed on relatively easily. For temporary fastening, such alternative connecting elements can also simply be inserted into the recess 30 with a stem-like element present.

The recess 30 is preferably round, but can also have a different contour, e.g. a polygonal contour.

The stem-like element 28 is fixed to the lamp by means of a screw (not shown) sunk into the bottom of the recess 30, the recess 30 preferably not extending over the entire length of the stem-like element, so that the rubber-elastic material 36 at the bottom of the recess provides a counter bearing for the screw. The screw is therefore easily accessible via the recess 30—e.g. for repair purposes.

If necessary, electrical contacts may also be provided on the stem-like element 28 to enable more convenient charging in special charging stations, which can also serve as an alternative lamp base (not shown).

The lamp 10 according to the invention achieves particularly favorable and glare-free lighting, e.g. when used with glass bottles, e.g. for use on restaurant tables, since the light from the lamp body 16, which shines primarily downwards, is partially reflected by the bottleneck area 40 or the bottle shoulder 32 and thus illuminates the surroundings without undesirable glare effects.

Typical dimensions of an exemplary embodiment of a lamp according to the invention are (each approximately dimensions) are:

| | |
|---|---|
| Total shade height (edge to top): | approx. 90 mm |
| Distance diffuser plate 18 from the edge of the shade: | approx. 16 mm |
| Total length of the stem-like element 28 (measured from the diffuser plate 18): | approx. 41 mm |
| Diameter of the stem-like element 28 on the diffuser plate 18: | approx. 21 mm |
| Diameter of the stem-like element 28 at the end: | approx. 17 mm |
| Diameter of the recess in the stem-like element 28: | approx. 9 mm |
| Depth of the recess in the stem-like element 28: | approx. 25 mm |
| Cone angle: | approx. 5.7° |
| Radius LED ring: | approx. 29 mm |
| Umbrella diameter at the bottom edge: | approx. 120 mm |
| Shade diameter upper face: | approx. 80 mm |

This dimensioning example, which may of course be deviated from in many ways, is suitable for fixing to a wide variety of common bottlenecks.

From a design point of view, the upper area of the screen in particular may be designed in a variety of modified ways, whereas on the other hand sizes such as the approximate lower shade diameter, the radius of the LED ring and the dimensions of the stem-like element are preferably retained essentially as above, since these sizes are tailored to the dimensions of common bottles. Possible deviations from the above-mentioned sizes adapted to the bottle can e.g. be ±10%.

For example, from a design perspective, the screen could have a polygonal contour, e.g. rectangular with rounded corners, or have a curved outer contour, which can be used to create a designer look similar to lampshades with pleated folds. Other design variants could include for example a purely cylindrical shape of the umbrella, i.e. not tapering upwards, whereby a conical shape of the outer contour may also be combined with one or more cylindrical sections, e.g. a conical shape at the top and a cylindrical end ring at the bottom. Furthermore, the casing curve spanning the outside of the screen could also be curved, i.e., the screen could, for example, be designed in a bell-shaped or hemispherical or ellipsoidal manner.

In this example, the stem-like element 28 has a total length which corresponds to approximately 45% of the total height of the lampshade, whereby the protrusion of the edge of the shade relative to the diffuser plate 18—in the example of 16 mm—causes that the stem-like element 28 (which is based on the diffusor plate 18) protrudes at a total of only approximately 25 mm (41 mm-16 mm) beyond the edge of the umbrella.

For very wide bottlenecks that have a larger diameter than the maximum diameter of the stem-like element 28, the lamp body sits on the bottleneck with its lower horizontal end, the diffuser or with a stop flange provided at the foot of the stem-like element. In this case, the bottleneck is partially covered by the projection d, but only to a small extent (in the example, by approximately 16 mm). Essentially, the bottleneck remains free, especially if it is narrower and the stem-like element 28 sits higher.

LIST OF REFERENCE SIGNS

10 Lamp (without bottle)
12 Bottle
14 Bottleneck mouth
16 Umbrella-like lamp body
18 Bottom base/diffuser
20 Lighting element/LED ring
22 On/off/dimming button
24 Inner space
26 Charging plug connection (USB)

28 Stem-like element
30 Recess
32 Bottle shoulder
34 Integrated battery
36 Rubber-elastic material/elastomer
38 Through hole for mounting screw
40 Bottleneck area
42 Reflector
44 Individual LEDs
d edge projection

The invention claimed is:

1. A lamp (10) comprising:

an umbrella-like lamp body (16), the lamp (10) having at least one lighting element (20) integrated into the lamp body (16), which in a position of use emits light at least in one direction downwards, wherein the lamp body (16) has a stem-like element (28) on its underside, which is designed to fixate the lamp (10) in the neck opening (14) of a commercially available bottle (12), wherein the lighting element (20) has at least a ring or a wreath of light emitters (44), which is arranged around the stem-like element (28), and whereas the lighting element (20) or at least one of the lighting elements (20) is positioned above the stem-like element (28) or in an area of the base of the stem-like element (28) or above the stem-like element's (28) front end, which front end faces away from the lamp body (16), wherein the stem-like element (28) is conical on the outside and has a recess (30) which is open towards the free end of the stem-like element (28) and which must not necessarily extend to the bottom of the stem-like element (28), and that the stem-like element (28) consists of an elastic material (36) at least in the area of the recess (30), such that the stem-like element (28) is compressible by a predetermined amount when fixated in the neck opening (14) of a commercially available bottle (12), so that a reliable frictional fixation in a bottleneck opening (14) and/or an adaptation to non-round bottleneck openings can be achieved.

2. The lamp (10) according to claim 1, wherein the stem-like element (28) is at least partially conical on the outside with a cone angle ≥4°.

3. The lamp (10) according to claim 1, wherein the stem-like element (28) is formed at least on its outside from a rubber-elastic material (36).

4. The lamp (10) according to claim 3, wherein the recess (30) open to the free end of the stem-like element (28) does not extend to the bottom of the stem-like element (28).

5. The lamp (10) according to claim 3, wherein the stem-like element (28) has a harder core made of a solid plastic or metal, and that this core has fastening means so that the stem-like element can alternatively be fixated by a screw connection after removing the external rubber-elastic material (36).

6. The lamp according to claim 1, wherein the stem-like element (28) has one or more of the following dimensional or material properties:

the length of the stem-like element (28) corresponds to 30% to 100% of the total height of the lamp body (16); and/or the total length of the stem-like element (28) is between approximately 30 mm and approximately 50 mm; and/or the outer diameter of the stem-like element (28) is between approximately 10 mm and approximately 25 mm; and/or the outer diameter of the stem-like element (28) tapers from a diameter on the lamp body (16) between 19 mm to 22 mm to a diameter at the free end between 15 mm to 18 mm; and/or the stem-like element (28) has a central, longitudinally extending recess (30) which is open towards the free end and has a diameter between 5 mm and 12 mm; and/or the stem-like element (28) has a central, longitudinally extending recess (30) which is open towards the free end and which extends only over approximately 30% to 60% of the length of the stem-like element (28); and/or the stem-like element (28) is made of food-safe materials (36).

7. The lamp (10) according to claim 1, wherein the at least one lighting element (20) integrated into the lamp body (16) comprises a ring or wreath formed of at least three light-emitting diodes (44) distributed uniformly over the circumference and/or formed of at least one linear LED, wherein the main emission direction of the LEDs (44) in each case points downwards.

8. The lamp (10) according to claim 1, wherein at least one of the lighting elements (20) formed from ring-shaped or ring-shaped lighting element has a ring or has a wreath radius ≤about 3.5 cm, so that this ring or wreath radius is smaller or not significantly higher than the radius of conventional bottles.

9. The lamp according to claim 1, wherein the lamp (10) in the state fixated in a bottle (12) can be fixated above the bottle opening (14) by the stem-like element (28) in such a way that the bottleneck area (40) is not covered by the umbrella-like lamp body (16) or is only covered in a mouth area (14) of the bottleneck area (40), so that light from a ring-shaped or wreath-shaped lighting element (20) radiating downwards can be reflected circumferentially into the surrounding space by the uncovered, upwardly tapering bottleneck surfaces.

10. The lamp (10) according to claim 1, wherein a battery or rechargeable battery element (34) is integrated into the lamp body (16), through which the at least one lighting element (20) can be supplied with power wirelessly.

11. The lamp (10) according to claim 1, wherein the umbrella-like lamp body (16) is made of a non-transparent material, so that the lamp (10) essentially only emits downwards.

12. The lamp (10) according to claim 1, wherein the umbrella-like lamp body (16) is round in top and bottom view, and that on its top at least one button-like or contactless switching element (22) is provided for on/off switching of the at least one lighting element (20) and optionally for brightness and/or light color adjustment, the switching element (22) being optionally opaque and translucently illuminated from the inside by the lighting element (20) integrated in the umbrella-like lamp body (16), whereas the umbrella-like lamp body (16) is splash-proof and/or protects against the ingress of foreign bodies.

13. A lamp arrangement, comprising:

a lamp (10) according to claim 1 and a bottle (12) as a lamp holder, in the bottleneck opening (14) of which the lamp (10) can be fixated by virtue of the stem-like element (28).

14. The lamp (10) according to claim 1, wherein the stem-like element is formed at least on its outside from a silicone elastomer.

15. A lamp, comprising:

an umbrella-like lamp body having a stem-like element on its underside, designed to fixate the lamp in a neck opening of a bottle;

at least one lighting element integrated into the lamp body, and having at least a ring or a wreath of light emitters arranged around the stem-like element, wherein the at least one of the lighting element is positioned above the stem-like element, in an area of the base of the stem-like element, or above the stem-like element's front end, which front end faces away from the lamp body, wherein the stem-like element is conical on the outside and has a recess which is open towards the free end of the stem-like element, wherein the stem-like element comprises an elastic material at least in the area of the recess, such that the stem-like element is compressible by a predetermined amount when fixated in the neck opening.

* * * * *